US007514836B2

(12) United States Patent
Berghänel et al.

(10) Patent No.: US 7,514,836 B2
(45) Date of Patent: Apr. 7, 2009

(54) INSULATED CARBON BRUSH GUIDE

(75) Inventors: Dietmar Berghänel, Chemnitz (DE); Rainer Schach, Berlin (DE); Jörg Skrippek, Priort (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 128 days.

(21) Appl. No.: 10/965,511

(22) Filed: Oct. 14, 2004

(65) Prior Publication Data

US 2005/0156478 A1 Jul. 21, 2005

(30) Foreign Application Priority Data

Oct. 14, 2003 (DE) ................................ 103 47 764

(51) Int. Cl.
*H02K 13/00* (2006.01)

(52) U.S. Cl. ....................... 310/239; 310/248; 310/251; 310/252

(58) Field of Classification Search ................. 310/239, 310/242, 248, 251–253
See application file for complete search history.

(56) References Cited

U.S. PATENT DOCUMENTS 2,783,405 A * 2/1957 Atkins et al. ................ 310/228
3,654,504 A * 4/1972 Susdorf et al. .............. 310/239
4,056,749 A * 11/1977 Carison et al. .............. 310/239
5,343,106 A * 8/1994 Lungu et al. ................ 310/239
5,481,150 A * 1/1996 Tanaka et al. ............... 310/249
5,952,763 A * 9/1999 Bruhn ........................ 310/238
2005/0156478 A1* 7/2005 Berghanel et al. ........... 310/242

FOREIGN PATENT DOCUMENTS

DE 759800 * 9/1953
DE 101 57 604 A1 6/2003
EP 0 358 812 A1 3/1990
EP 0 510 647 10/1992
GB 219346 * 12/1987
JP 04372546 * 12/1992
JP 2002-238219 * 7/2002

OTHER PUBLICATIONS

Translation of DE 759 800, Alfred Oldenburg, Sep. 1953, “Brush Holder for Electrical Machinery”.*

* cited by examiner

*Primary Examiner*—Karl I Tamai
(74) *Attorney, Agent, or Firm*—Russell W. Warnock; James E. Howard

(57) ABSTRACT

A carbon brush guide for dynamoelectric machines, in particular for electric motors. The carbon brush guide is produced from aluminum and has at least one insulating layer made of anodized aluminum. Such a carbon brush guide is used in particular for multilayer carbon brushes. The carbon brush guide produces little brush noise, and experiences less wear and tear.

12 Claims, 1 Drawing Sheet

INSULATED CARBON BRUSH GUIDE

BACKGROUND OF THE INVENTION

Field of the Invention

The invention relates to a carbon brush guide for a current transfer unit of a dynamoelectric machine, in particular for an electric motor. The current transfer unit contains at least one carbon brush, which is in particular in the form of a multilayer carbon brush, and a metal carbon brush guide which has an insulating layer at least on the side of the carbon brush.

Published, Non-Prosecuted German Patent Application DE 101 57 604 A1 discloses a carbon brush guide of an electric motor which contains a galvanized steel sheet coated with an insulating layer and is suitable in particular for multilayer carbon. The insulating layer applied in the carbon brush guide serves the purpose of preventing a short-circuit current or cross current between the individual layers of the multilayer carbon brush. A varnish such as phenolic resin, epoxy resin or polystyrene resin is applied as an insulating layer to the steel sheet of the carbon brush guide. When such an insulation is used between the carbon brush guide and the multilayer carbon brush, the interspace may have narrow tolerances. One disadvantage with such an insulation is the fact that the insulating layer cannot have such a high thermal and mechanical load applied to it as a pure metal guide.

In the case of a tubular metal brush known from Published, European Patent Application EP 0 358 812 A1, i.e. a metal brush guide, for a multilayer carbon brush, the guide walls of the tubular brush are coated with an insulating layer of polytetrafluoroethylene. In order to achieve a sufficient mechanical adhesion and resistance of the insulating layer, the tubular brush must be pretreated in a complex manner, and the insulating layer must be relatively thick. The production costs are considerably increased by such a configuration of the tubular metal brush as compared with conventional tubular brushes. In addition, the gaps between the carbon brush guide and the carbon brush cannot have such narrow tolerances, since the layer thickness of such an insulation itself has relatively high thickness differences.

Moreover, carbon brush guides are also known from the prior art which are generally made of a brass sheet and do not have an insulating layer. There must be large gaps between such an electrically conductive carbon brush guide and a multilayer carbon brush in order for the multilayer carbon brush generally only with a maximum of one carbon layer to come into contact with the carbon brush guide. By rotating the commutator, against which the carbon brushes rest, the carbon brushes can tilt within the carbon brush guide such that at least two different layers of the carbon brush come into linear contact with the guide. In this position, short-circuit currents are thus produced which result in excessive heating of the motor windings and the collector and in increased brush wear. In addition, the carbon brush runs in this tilted position over a brush edge, as a result of which unnecessary brush noise is still produced.

SUMMARY OF THE INVENTION

It is accordingly an object of the invention to provide an insulated carbon brush guide which overcomes the above-mentioned disadvantages of the prior art devices and methods of this general type. It is thus possible for the insulation of the carbon brush guide to have a high thermal and mechanical load applied to it, and which can be produced economically. In this case, the carbon brush guide is first configured such that, when it is used according to the specifications in a dynamoelectric machine, no unnecessary brush noise is produced, and, second, the carbon brush has as little wear as possible.

With the foregoing and other objects in view there is provided, in accordance with the invention, a metal carbon brush guide for a current transfer unit of a dynamoelectric machine. The current transfer unit contains at least one carbon brush and the metal carbon brush guide. The metal carbon brush guide contains a metal carbon brush guide body made of aluminum and having at least one aluminum oxide layer on a side facing the carbon brush. The aluminum oxide layer functions as an insulating layer.

It has been shown to be particularly advantageous to produce the carbon brush guide from aluminum, since aluminum has very good thermoelectric properties. In addition, the aluminum advantageously forms a nonconductive, very thin oxide layer when it is anodized. The aluminum oxide layer or anodized aluminum layer generally has a thickness of 5 μm to 30 μm and in this case is still very durable and has a high thermal and mechanical properties. In addition, the good thermal properties of the aluminum are advantageously maintained.

Owing to one advantageous development of the invention in which the anodized aluminum layer is in the form of a heat-absorbing layer, the heat produced at the commutator can be absorbed by the anodized aluminum layer and dissipated via the thermally conductive carbon brush guide. This is therefore of particular significance since, during operation of the dynamoelectric machine, the heat produced at the commutator, in particular at the contact point between the carbon brush and the commutator, must be dissipated as quickly and sufficiently as possible. As a result, wear on the carbon brush may advantageously also be reduced.

In order to form a heat-absorbing layer, the anodized aluminum layer is advantageously formed in a dark color, preferably black.

The current transfer unit contains the carbon brush guide and the carbon brush may also contain a holder for accommodating the carbon brush guide. The holder is generally made of plastic. In order in the case of such a current transfer unit for it to be possible for the heat to be dissipated again by the carbon brush guide, the carbon brush guide is advantageously not completely surrounded by the plastic holder. Thus, the heat can be emitted again via the free outer faces of the carbon brush guide.

A particularly cost-effective method for producing the carbon brush guide has proved to be one in which the carbon brush guide is bent from an anodized aluminum sheet. Anodization of the ready-manufactured aluminum carbon brush guide proved to be significantly more complex. In addition, when anodizing flat surfaces, very uniform layer thicknesses can be produced.

When bending an anodized aluminum sheet, it may be the case that the anodized aluminum layer rips in the bend regions. In these ripped regions, the insulating action is considerably reduced. In one further advantageous development of the invention, the carbon brush and/or the carbon brush guide is/are configured such that the carbon brush and the carbon brush guide cannot come into contact in the ripped regions of the anodized aluminum layer. As a result, formation of short-circuit currents, in particular between the layers of a multilayer carbon brush, is reliably ruled out.

It is advantageously also possible for the carbon brush to be provided with a bevel on its longitudinal edges in order thus to produce the required spacing between the ripped regions of the anodized aluminum layer and the carbon brush guide.

Other features which are considered as characteristic for the invention are set forth in the appended claims.

Although the invention is illustrated and described herein as embodied in an insulated carbon brush guide, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
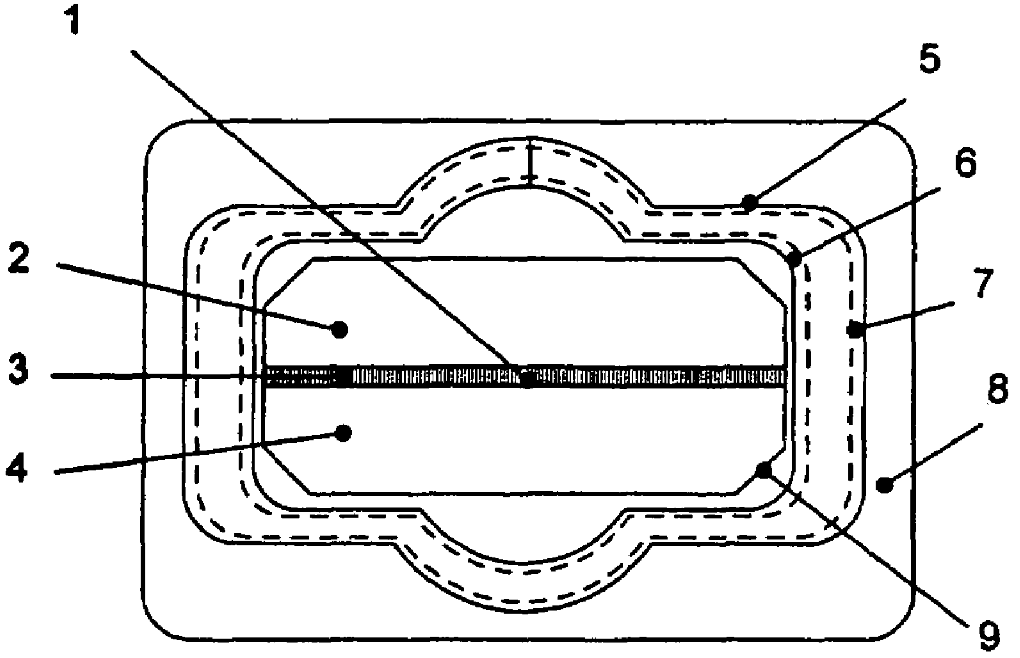
FIG. 1 is a diagrammatic, cross-sectional view through a carbon brush guide of a current transfer unit having a multi-layer carbon brush according to the invention.

Referring now to the figures of the drawing in detail and first, particularly, to FIG. 1 thereof, there is shown in an exemplary embodiment of a carbon brush guide 5 which is intended for a current transfer unit for a washing machine electric motor. The washing machine electric motor is preferably a universal motor. A non-illustrated universal motor contains, inter alia, a stator, a rotor, a commutator, two bearing brackets and the current transfer unit which contains the carbon brush guide 5, a carbon brush 1 and a holder 8. The rotor and the stator are each provided with iron laminated cores and corresponding windings for producing magnetic fields. The commutator is mechanically connected to the rotor shaft and electrically connected to the rotor windings. The stator is mechanically fixed to the bearing brackets that also serve the purpose of accommodating and bearing the rotor shaft. Fixed to one of the bearing brackets is, inter alia, the holder 8 of the current transfer unit.

As in the case of washing machine motors in AC operation, the carbon brushes are generally in the form of multilayer carbon brushes in order to achieve better commutation. FIG. 1 shows a two-layer carbon brush 1 that contains two conductive carbon halves 2, 4 that are connected to one another by a nonconductive connection 3. One end face of the carbon brush 1 rests on the commutator, as a result of which a conductive connection is produced between a commutator bar and the carbon brush 1, and contact is made between the other end face of the carbon brush 1 and a power supply wire, as a result of which the two carbon halves 2 and 4 are electrically connected to one another at the contact point.

The carbon brush guide 5 is illustrated purely schematically in FIG. 1. In the present exemplary embodiment, the carbon brush guide 5 is made from an aluminum sheet that is anodized on both sides. The carbon brush guide 5 thus has a nonconductive aluminum oxide or anodized aluminum layer 6, 7 on both sides. The layer 6 facing the carbon brush 1 causes the two carbon halves 2 and 4 not to be short-circuited in the potential case of contact with the carbon brush guide 5. Such contact occurs in particular when the carbon brush 1 tilts slightly in the carbon brush guide 5 during operation. The insulating layer 6 prevents a short circuit between the carbon halves 2 and 4. As a result, the carbon halves 2, 4 always have the same amount of current flowing through them. The flow of current through the carbon halves 2, 4 results in uniform and low brush wear.

In the present example, the outer wall of the carbon brush guide 5 is also equipped with a nonconductive anodized aluminum layer 7. As a result, possible creepage currents between the conductive bearing bracket and the carbon brush guide 5 are prevented. This is particularly significant when the holder 8 cannot ensure a sufficient spacing between the bearing bracket and the carbon brush guide 5 owing to its shape.

In one alternative embodiment, the carbon brush guide 6 is mounted directly on the bearing bracket, since the outer anodized aluminum layer 7 is sufficiently insulating.

The current transfer unit can thus be produced even more cost-effectively, since the holder 8 of the carbon brush guide 5 can be dispensed with.

The anodized aluminum layer 6, 7 is applied at, a thickness of 15 μm on the carbon brush guide 5. However, other layer thicknesses of between 5 and 30 μm are also possible. Such anodized aluminum layers 6, 7 are sufficiently insulating and are in this case very wear-resistant and resistant to climatic and chemical influences. Since the thickness of the anodized aluminum layer 6 can be produced such that it is very uniform, and contact between the carbon brush 1 and the carbon brush guide 5 is possible owing to the nonconductive anodized aluminum layer 6, the guide gap (play) between the carbon brush 1 and the carbon brush guide 5 may have very narrow tolerances. A transverse play according to DIN 43008 between the carbon brush 1 and the carbon brush guide 5 is easily maintained in the present exemplary embodiment, and tilting of the carbon brush 1 in the carbon brush guide 5 is thus prevented. Such precise guiding of the carbon brush 1 makes it impossible for a carbon brush edge to run over a commutator bar and thus to produce a corresponding brush noise.

The anodized aluminum layer 6 of the carbon brush guide 5 is produced in a black color on the face facing the carbon brushes 1. Such a coloring of the anodized aluminum layer 6 can easily be achieved in an anodizing process by suitable selection of the production parameters. Other, in particular dark, colors are also conceivable which can easily absorb the radiated heat. This special coloring makes it possible for the heat, which is produced in the region of the carbon brush 1 and which is radiated by the contact point between the carbon brush 1 and the commutator and by the carbon brush 1 in the form of radiated heat, to be effectively absorbed by the anodized aluminum layer 6.

The heat absorbed by the anodized aluminum layer 6 is emitted to the aluminum carbon brush guide 5 and is radiated again on the side facing away from the carbon brushes 1. In order to ensure unimpeded heat radiation, the holder 8 of the carbon brush guide 5 is configured such that the carbon brush guide 5 is not completely surrounded by the holder 8. The free outer faces of the carbon brush guide 5 then radiate the heat to the surrounding area. The heat radiation or the heat emission of the exposed faces of the carbon brush guide is also assisted when the carbon brush guide is disposed in an air flow produced by the motor itself. The air flow can be influenced by suitable configuration of the bearing brackets and/or of the stator.

In one alternative embodiment of the current transfer unit that does not contain the holder 8, the carbon brush guide 5 is fixed to the bearing bracket of the motor such that it is in direct contact with the bearing bracket. As a result, the heat dissipation from the region of the carbon brush 1 is also assisted, since the heat absorbed by the carbon brush guide 5 is emitted directly to the bearing bracket. Such a direct fixing of the carbon brush guide 5 to the bearing bracket is made possible by the nonconductive outer anodized aluminum layer 7.

For an advantageous production of the carbon brush guide 5 according to the invention, an aluminum sheet is anodized in a first manufacturing step. In a second manufacturing step, a semi-finished product for the carbon brush guide 5 is manufactured from such an anodized aluminum sheet. In the present exemplary embodiment, the semi-finished product is stamped out of the anodized aluminum sheet, but other suitable methods are also conceivable. The semi-finished product is then bent in a third manufacturing step to form the carbon brush guide 5. In the case of an aluminum sheet that is anodized on one side, the bending procedure is configured such that the anodized aluminum layer 6 is on the inside, i.e. in the guide region of the carbon brush 1.

Figure 2:
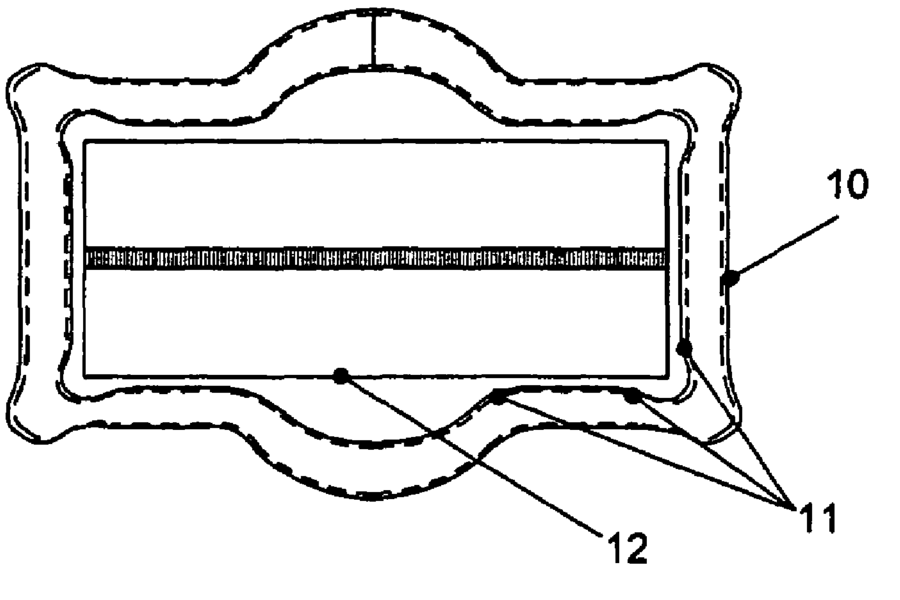
FIG. 2 is a diagrammatic, cross-sectional view through a specially shaped carbon brush guide.

When the pre-anodized aluminum sheet is bent, an anodized aluminum layer may rip in the bending region. Owing to such rips, the insulating action of the anodized aluminum layer 6 with respect to the carbon brush 1 may be reduced in the bending region. FIG. 2 shows a favorable possible configuration for a carbon brush guide 10, in which each shaped region of the carbon brush guide begins and ends with a convex curvature 11, i.e. a curvature 11 which faces away from the carbon brush 12. As a result, the carbon brush 12 can only come into contact with the unbent faces of the carbon brush guide 10 in the event of a displacement. Contact between the carbon brush 12 and the regions which may have possible rips in the anodized aluminum layer 6 is thus ruled out. In the course of time, the exposed regions of the aluminum within the rip automatically form an insulating layer made of $Al_2O_3$ again owing to the oxygen in the air.

An alternative current transfer unit contains the carbon brush 1 having a special design, in which the longitudinal edges of the carbon brush 1 each have a bevel 9, as is also illustrated in FIG. 1. In this embodiment too, it is ensured that the carbon brush 1 cannot come into contact with the bending regions of the carbon brush guide 5 in the event of a displacement.

The present invention is not restricted to the use of multilayer carbon brushes, but may also be used for block carbon brushes. The same configuration for the carbon brush guide can thus advantageously be used for both types of carbon brush or for AC and DC motors.

This application claims the priority, under 35 U.S.C. §119, of German patent application No. 103 47 764.0, filed Oct. 14, 2003; the entire disclosure of the prior application is herewith incorporated by reference.

We claim:

1. A current transfer unit, comprising:

a carbon brush guide formed from a flat sheet of aluminum, having at least one aluminum oxide layer functioning as an insulating layer, and having unbent faces and shaped regions beginning and ending with convex curvatures; and a carbon brush, at least one of said carbon brush and said carbon brush guide being shaped such that said carbon brush can only come into contact with said unbent faces of said carbon brush guide, wherein the aluminum sheet is anodized prior to a bending process that bends the flat sheet and the carbon brush includes a plurality of sides and a plurality of transition areas, each of the transition areas forming a transition between a respective side of the carbon brush and another side of the carbon brush and the carbon brush being disposed in the carbon brush guide with the carbon brush guide having a first unbent face of the carbon brush guide in facing relationship to one side of the carbon brush, a second unbent face of the carbon brush guide in facing relationship to another side of the carbon brush interconnected to the one respective side of the carbon brush by a respective transition area, and a first shaped region of the carbon brush guide extending between the first and second unbent faces of the carbon brush guide, the first shaped region of the carbon brush guide having a curvature facing away from the carbon brush in a manner such that, in the event of a displacement of the carbon brush relative to the carbon brush guide, the one side of the carbon brush and the another side of the carbon brush respectively come into contact with the first unbent face of the carbon brush guide and the second unbent face of the carbon brush guide and there is no contact between the respective transition area of the carbon brush and the first shaped region of the carbon brush guide.

2. The current transfer unit according to claim 1, wherein the first unbent face of the carbon brush guide and the second unbent face of the carbon brush guide each define a line perpendicular to the unbent face and the line of the first unbent face of the carbon brush guide and the line of the second unbent face of the carbon brush guide intersect at an intersection and the carbon brush lies inwardly of the intersection and the first shaped region of the carbon brush guide lies outwardly of the intersection.

3. The current transfer unit according to claim 1, wherein the first unbent face of the carbon brush guide and the second unbent face of the carbon brush guide each define a line tangential to an inner surface of the unbent face and the line of the first unbent face of the carbon brush guide and the line of the second unbent face of the carbon brush guide intersect one another at a perpendicular intersection and the carbon brush lies inwardly of the perpendicular intersection and the first shaped region of the carbon brush guide lies outwardly of the perpendicular intersection.

4. A dynamoelectric machine, comprising:

a current transfer unit containing a carbon brush guide formed from a flat sheet of aluminum, having at least one aluminum oxide layer functioning as an insulating layer. and having a plurality of shaped regions and a plurality of unbent faces, wherein each shaped region begins and ends with a convex curvature and a carbon brush facing said aluminum oxide layer of said carbon brush guide, at least one of said carbon brush and said carbon brush guide being shaped such that said carbon brush can only come into contact with said unbent faces of said carbon brush guide, wherein the aluminum sheet is anodized prior to a bending process that bends the flat sheet and the carbon brush includes a plurality of sides and a plurality of transition areas, each of the transition areas forming a transition between a respective side of the carbon brush and another side of the carbon brush and the carbon brush being disposed in the carbon brush guide such that a first unbent face of the carbon brush guide is in facing relationship to one side of the carbon brush, a second unbent face of the carbon brush guide is in facing relationship to another side of the carbon brush interconnected to the one respective side of the carbon brush by a respective transition area, and a first shaped region of the carbon brush guide extends between the first and second unbent faces of the carbon brush guide, the first shaped region of the carbon brush guide having a curvature facing away from the carbon brush in a manner such that, in the event of a displacement of the carbon brush relative to the carbon brush guide, the one side of the carbon brush and the another side of the carbon brush respectively come into contact with the first unbent face of the carbon brush guide and the second unbent face of the carbon brush guide and there is no contact between the respective transition area of the carbon brush and the first shaped region of the carbon brush guide.

5. The dynamoelectric machine according to claim 4, wherein the first unbent face of the carbon brush guide and the second unbent face of the carbon brush guide each define a line perpendicular to the unbent face and the line of the first unbent face of the carbon brush guide and the line of the second unbent face of the carbon brush guide intersect at an intersection and the carbon brush lies inwardly of the intersection and the first shaped region of the carbon brush guide lies outwardly of the intersection.

6. The dynamoelectric machine according to claim 4, wherein the first unbent face of the carbon brush guide and the second unbent face of the carbon brush guide each define a line tangential to an inner surface of the unbent face and the line of the first unbent face of the carbon brush guide and the line of the second unbent face of the carbon brush guide intersect one another at a perpendicular intersection and the carbon brush lies inwardly of the perpendicular intersection and the first shaped region of the carbon brush guide lies outwardly of the perpendicular intersection.

7. The current transfer unit according to claim 1, wherein said aluminum oxide layer is an artificially applied anodized aluminum layer.

8. The current transfer unit according to claim 7, wherein said anodized aluminum layer has a thickness of about 15 μm.

9. The current transfer unit according to claim 7, wherein said anodized aluminum layer, on said side facing the carbon brush, is suitable for absorbing heat rays.

10. The current transfer unit according to claim 9, wherein said anodized aluminum layer, on said side facing the carbon brush, has a dark color.

11. The current transfer unit according to claim 10, wherein said dark color is black.

12. The current transfer unit according to claim 1, wherein:

said aluminum oxide layer is at least two aluminum oxide layers each disposed on one side of said carbon brush guide body.

* * * * *